US008240289B2

(12) United States Patent
Tanaka

(10) Patent No.: US 8,240,289 B2
(45) Date of Patent: Aug. 14, 2012

(54) CONTROL APPARATUS FOR INTERNAL COMBUSTION ENGINE

(75) Inventor: Hiroyuki Tanaka, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 379 days.

(21) Appl. No.: 12/450,165

(22) PCT Filed: Mar. 17, 2008

(86) PCT No.: PCT/JP2008/054882

§ 371 (c)(1), (2), (4) Date: Sep. 14, 2009

(87) PCT Pub. No.: WO2008/139778

PCT Pub. Date: Nov. 20, 2008

(65) Prior Publication Data

US 2010/0101532 A1 Apr. 29, 2010

(30) Foreign Application Priority Data

May 14, 2007 (JP) ................................ 2007-128514

(51) Int. Cl.
*F02D 41/00* (2006.01)
*B60T 7/12* (2006.01)
*G05D 1/00* (2006.01)
*G06F 7/00* (2006.01)
*G06F 17/00* (2006.01)

(52) U.S. Cl. ........................ 123/350; 123/361; 701/104

(58) Field of Classification Search .................. 123/361, 123/376, 403; 701/102, 103, 50, 54, 84, 701/110, 115

See application file for complete search history.

(56) References Cited

U.S. PATENT DOCUMENTS 6,182,635 B1 * 2/2001 Nishida ........................ 123/399

(Continued)

FOREIGN PATENT DOCUMENTS

JP A-2000-097073 4/2000
JP A 2000-110632 4/2000

(Continued)

OTHER PUBLICATIONS

Notification of Reasons for Refusal issued in Japanese Patent Application No. 2007-128514; mailed Nov. 18, 2008; with English-language translation.

*Primary Examiner* — Stephen K Cronin
*Assistant Examiner* — Sherman Manley
(74) *Attorney, Agent, or Firm* — Oliff & Berridge, PLC

(57) ABSTRACT

The present invention relates to a control apparatus for an internal combustion engine. It is an object of the present invention to prevent an excessive reaction of a throttle valve when the throttle valve is driven on the basis of a throttle opening calculated from a plurality of required torques. Step 100 is performed to consolidate the plurality of required torques. Step 102 is then performed to judge whether the sensitivity of throttle opening variation corresponding to torque variation is high. When the sensitivity is judged to be high, step 106 is performed to convert only a fluctuating required torque to a throttle opening. Step 108 is then performed to consolidate the remaining required torques and convert the resulting consolidated required torque to a throttle opening. Next, the required throttle opening calculated in step 106 and the required throttle opening calculated in step 108 are consolidated to calculate a final throttle opening.

2 Claims, 5 Drawing Sheets

U.S. PATENT DOCUMENTS

| | | | | |
|---|---|---|---|---|
| 6,276,333 | B1 | 8/2001 | Kazama et al. | |
| 6,612,284 | B1 | 9/2003 | Takagi et al. | |
| 2006/0081216 | A1 | 4/2006 | Muto et al. | |
| 2010/0108028 | A1* | 5/2010 | Aso | 123/339.11 |

FOREIGN PATENT DOCUMENTS

| | | |
|---|---|---|
| JP | A-2001-003781 | 1/2001 |
| JP | A-2006-118373 | 5/2006 |
| JP | A-2007-046502 | 2/2007 |

* cited by examiner

CONTROL APPARATUS FOR INTERNAL COMBUSTION ENGINE

TECHNICAL FIELD

The present invention relates to a control apparatus for an internal combustion engine.

BACKGROUND ART

A technology disclosed in JP-A-2000-97073 relates to a control apparatus for an internal combustion engine and prevents an excessive throttle valve reaction to a small change in a target torque in a region where a throttle opening greatly changes in response to a change in the target torque. In the above region, the control apparatus calculates the throttle opening from an accelerator opening. In a region other than the above region, however, the control apparatus calculates the throttle opening from the target torque.

Patent Document 1: JP-A-2000-97073

DISCLOSURE OF THE INVENTION

Problem to be Solved by the Invention

However, the target torque is output not only in accordance with a driver's request which is reflected in the accelerator opening, but also in accordance, for instance, with a request of vehicle motion control. The conventional technology described above is disadvantageous in that it cannot comply with a request generated for vehicle motion control and other requests that are not generated by a driver.

The present invention has been made in view of the above circumstances. An object of the present invention is to provide a control apparatus for an internal combustion engine, the control apparatus being capable of preventing an excessive reaction of a throttle valve when the throttle valve is driven on the basis of a throttle opening calculated from a plurality of required torques.

Means for Solving the Problem

First aspect of the present invention is a control apparatus for an internal combustion engine, the control apparatus comprising:

a plurality of required torque output means each of which outputs a required torque on the basis of its own purpose to the internal combustion engine;

sensitivity judgment means for judging, on the basis of an after-consolidation required torque, whether a sensitivity of throttle opening variation corresponding to torque variation is higher than a reference value, the after-consolidation required torque being determined by consolidating the required torques output from the plurality of required torque output means; and throttle opening calculation means which, when the sensitivity is judged to be higher than the reference value, calculates a throttle opening by consolidating a first required throttle opening and a second required throttle opening, the first required throttle opening being determined by converting the most fluctuant one of the plurality of required torques to a throttle opening, the second required throttle opening being determined by consolidating the remaining required torques and converting the resulting consolidated required torque to a throttle opening.

Second aspect of the present invention is a control apparatus for an internal combustion engine, the control apparatus comprising:

a plurality of required torque output means each of which outputs a required torque on the basis of its own purpose to the internal combustion engine;

throttle opening calculation means for calculating a throttle opening on the basis of an after-consolidation required torque, the after-consolidation required torque being determined by consolidating the required torques output from the plurality of required torque output means;

sensitivity judgment means for judging, on the basis of the after-consolidation required torque, whether a sensitivity of throttle opening variation corresponding to torque variation is higher than a reference value; and engine speed change means which, when the sensitivity is judged to be higher than the reference value, changes an engine speed so that the engine speed moves to a region where the sensitivity is lower than the reference value.

Third aspect of the present invention is the control apparatus according to the second aspect, wherein the engine speed change means changes the engine speed by increasing the after-consolidation required torque for correction purposes.

Fourth aspect of the present invention is the control apparatus according to the second aspect, wherein the engine speed change means changes the engine speed by changing an accessory load.

Advantages of the Invention

The first aspect of the present invention makes it possible to judge, when a throttle opening is calculated on the basis of a plurality of required torques brought to the internal combustion engine, whether the sensitivity of throttle opening variation corresponding to torque variation is high, on the basis of an after-consolidation required torque obtained by consolidating the plurality of required torques. When the sensitivity of throttle opening variation corresponding to torque variation is judged to be high, a final throttle opening can be calculated by consolidating a first required throttle opening and a second required throttle opening, the first required throttle opening being determined by converting only the most fluctuant required torque to a throttle opening, the second required throttle opening being determined by consolidating the remaining required torques and converting the resulting consolidated required torque to a throttle opening. Consequently, the throttle opening is prevented from changing excessively as compared with the case where the after-consolidation required torque is directly converted to a throttle opening. Therefore, it is possible to surely prevent the throttle valve from exhibiting an excessive reaction (performing an undue operation). Consequently, the durability of the throttle valve can be enhanced to avoid contingencies such as malfunction.

The second aspect of the present invention makes it possible to judge, when a throttle opening is calculated on the basis of a plurality of required torques brought to the internal combustion engine, whether the sensitivity of throttle opening variation corresponding to torque variation is high on the basis of an after-consolidation required torque obtained by consolidating the plurality of required torques. When the sensitivity of throttle opening variation corresponding to torque variation is judged to be high, an engine speed can be moved to a region where the sensitivity is low by changing the engine speed. Therefore, it is possible to surely prevent the throttle valve from exhibiting an excessive reaction (performing an undue operation). Consequently, the durability of the throttle valve can be enhanced to avoid contingencies such as malfunction.

The third aspect of the present invention makes it possible to change the engine speed promptly and accurately by increasing the after-consolidation required torque for correction purposes. Consequently, it is possible to more surely prevent the throttle valve from exhibiting an excessive reaction.

The fourth aspect of the present invention makes it possible to change the engine speed promptly and accurately by increasing the after-consolidation required torque for correction purposes. Consequently, it is possible to more surely prevent the throttle valve from exhibiting an excessive reaction.

DESCRIPTION OF REFERENCE NUMERALS

Figure 1:
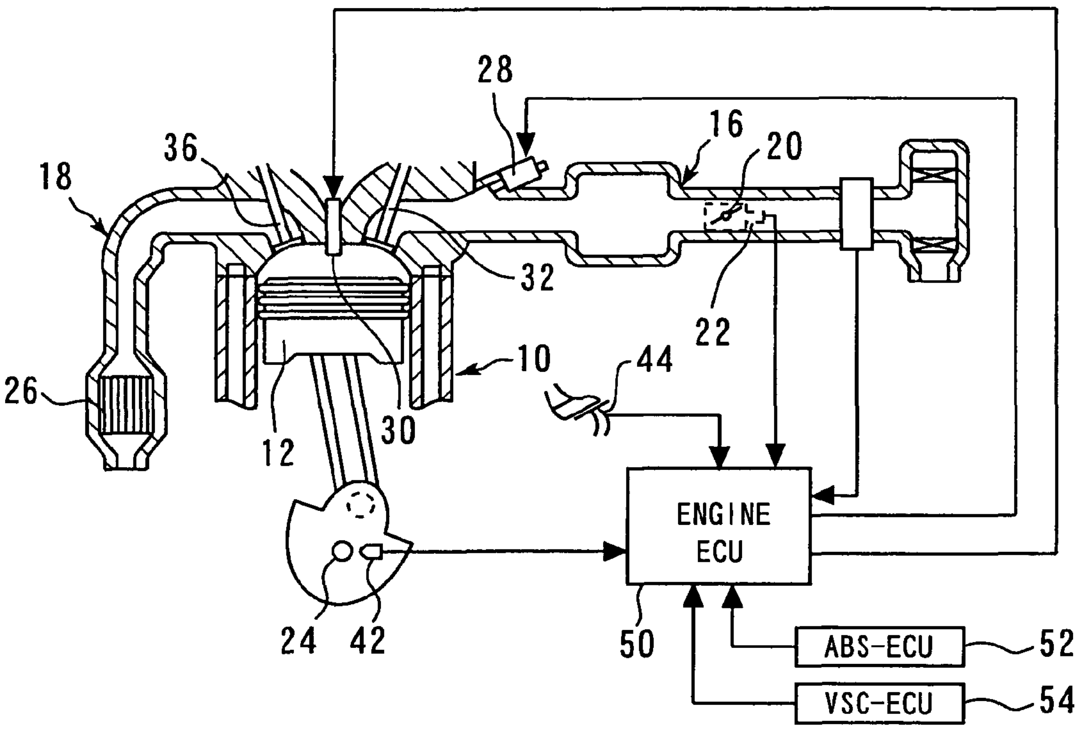
FIG. 1 shows the configuration of a system according to a first embodiment of the present invention.

10 internal combustion engine
12 piston
16 intake path
18 exhaust path
20 throttle valve
26 catalyst
32 intake valve
36 exhaust valve
50 ECU

BEST MODE FOR CARRYING OUT THE INVENTION

First Embodiment

[Description of System Configuration]

FIG. 1 is a diagram illustrating the configuration of an internal combustion engine system according to a first embodiment of the present invention. The system shown in FIG. 1 includes an internal combustion engine 10 which is mounted in a vehicle. The number of cylinders in the internal combustion engine 10 and the arrangement of the cylinders are not specifically defined. Each cylinder of the internal combustion engine 10 includes a piston 12. Further, each cylinder is in communication with an intake path 16 and an exhaust path 18.

An electronically controlled throttle valve 20 is installed in the intake path 16. A throttle position sensor 22 is installed near the throttle valve 20 to detect the opening of the throttle valve 20 (hereinafter referred to as the "throttle opening"). A catalyst 26 for purifying an exhaust gas is installed in the exhaust path 18.

Each cylinder of the internal combustion engine 10 also includes a fuel injector 28 for injecting fuel into an intake port, an ignition plug 30 for igniting an air-fuel mixture in a combustion chamber, an intake valve 32, and an exhaust valve 36. The present invention is applicable not only to a port injection engine shown in the figure, but also to an intra-cylinder direct injection engine and the combination of these engines.

A crank angle sensor 42 is installed near a crankshaft 24 of the internal combustion engine 10 to detect a rotation angle of the crankshaft 24 (crank angle). An accelerator position sensor 44 is installed near an accelerator pedal to detect an accelerator opening.

The system also includes an engine ECU (Electronic Control Unit) 50. The engine ECU (hereinafter simply referred to as the "ECU") 50 is electrically connected to various sensors such as the aforementioned throttle position sensor 22, crank angle sensor 42, and accelerator position sensor 44, and various actuators such as the aforementioned throttle valve 20, fuel injector 28, and ignition plug 30.

The system further includes an ABS-ECU 52 for controlling a vehicle's anti-lock braking system and a VSC-ECU 54 for controlling a vehicle stability control system.

[Features of First Embodiment]

In the present embodiment, a plurality of required torques are brought to the internal combustion engine 10. The required torques include, for instance, a driver required torque which is required by a driver and calculated from the accelerator opening, an accessory drive required torque which is required for driving accessories, an ABS required torque which is output from the ABS-ECU 52, and a VSC required torque which is output from the VSC-ECU 54. On the basis of the plurality of required torques, the ECU 50 calculates a throttle opening command value for the throttle valve 20 (hereinafter simply referred to as the "throttle opening"). A comparative example of a throttle opening calculation method will be described below to facilitate the understanding of operation and advantages of the present embodiment before a throttle opening calculation method of the present embodiment is described.

(Comparative Example of Throttle Opening Calculation Method)

Figure 2:
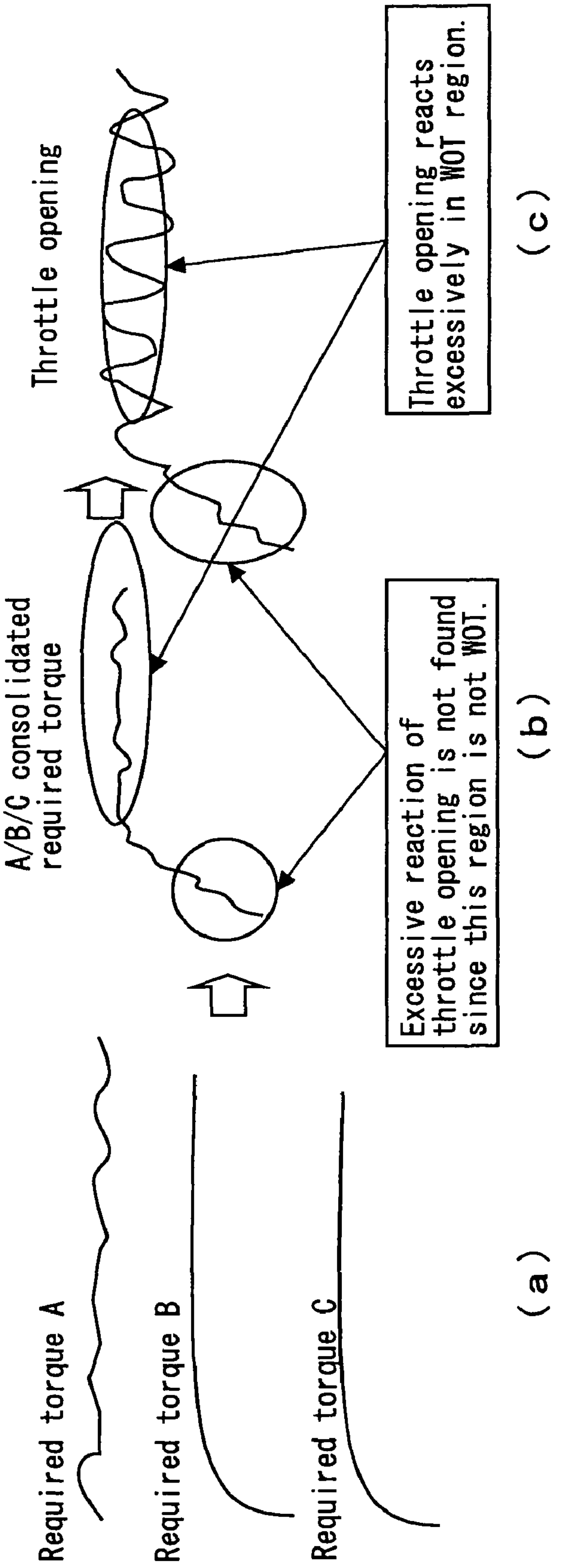
FIG. 2 is a diagram illustrating a throttle opening calculation method of a comparative example.

FIG. 2 is a diagram illustrating a throttle opening calculation method of the comparative example. As shown in FIG. 2 (*a*), it is assumed that there are three required torques (required torques A, B, and C). In marked contrast to required torques B and C, required torque A has very small fluctuations.

FIG. 2 (*b*) shows a required torque which is obtained by consolidating (e.g., adding) required torques A, B, and C. The required torque is hereinafter referred to as the "A/B/C consolidated required torque". The A/B/C consolidated required torque fluctuates due to the fluctuation of required torque A.

In the internal combustion engine 10, torque is determined in accordance with an engine speed and throttle opening. The ECU 50 stores a torque/throttle opening map, which indicates the relationship among the engine speed, the torque and the throttle opening. FIG. 2 (*c*) shows a throttle opening which is calculated by converting the A/B/C consolidated required torque in FIG. 2 (*b*) on the basis of the torque/throttle opening map.

In general, when the throttle valve 20 of the internal combustion engine 10 is within a region where the throttle valve 20 is substantially wide open (this region is hereinafter referred to as the "WOT (Wide Open Throttle) region"), the throttle opening changes relatively greatly in response to torque variation. In the WOT region, therefore, the throttle opening variation due to the fluctuation of the A/B/C consolidated required torque is excessively great as shown in FIG. 2C. Consequently, when the throttle opening is calculated by the method indicated in the comparative example, the throttle valve 20 reacts excessively in the WOT region and is likely to repeat a rapid operation. As a result, the throttle valve 20 becomes burdened so that a malfunction or other problem may occur.

(Throttle Opening Calculation Method According to First Embodiment)

Figure 3:
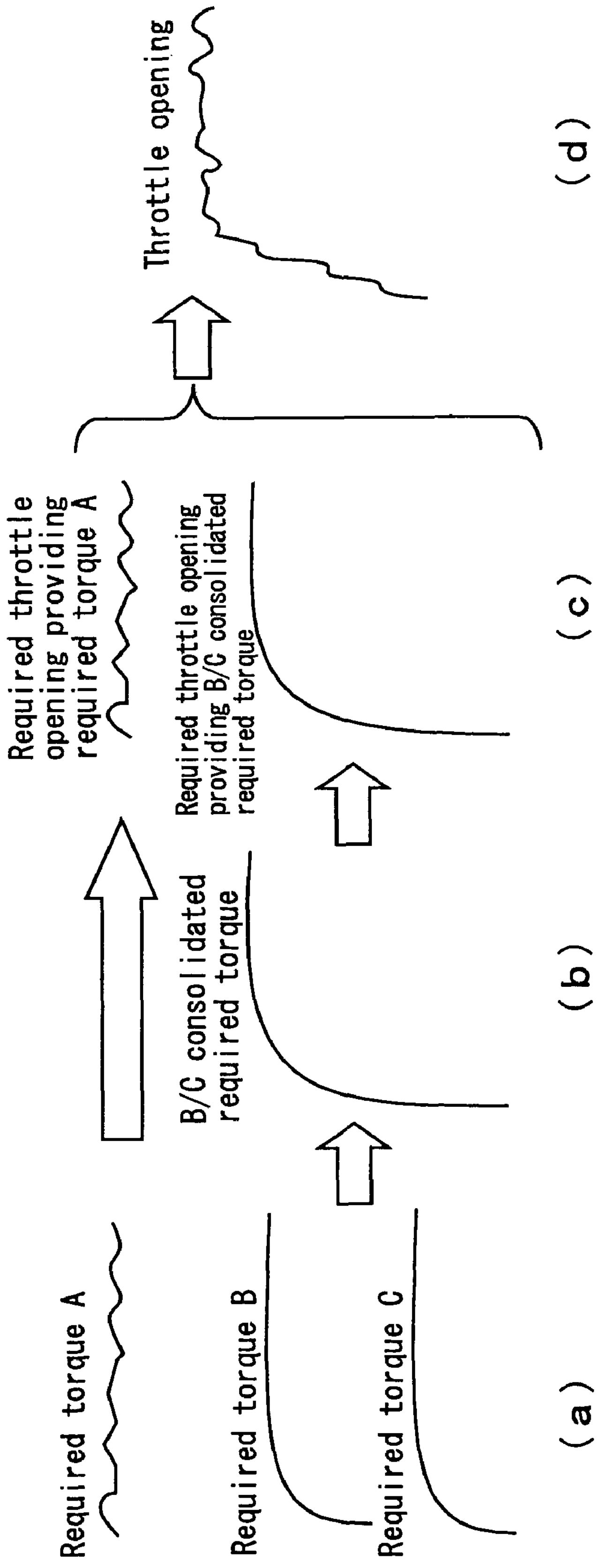
FIG. 3 is a diagram illustrating a throttle opening calculation method according to the first embodiment.

To avoid the above-described problem, the present embodiment calculates the throttle opening as described below. FIG. 3 is a diagram illustrating a throttle opening calculation method according to the present embodiment. When there are required torques A, B, and C as shown in FIG. 3 (*a*), at first, the present embodiment converts only the required torque A which is the most fluctuant of the three, to a throttle opening on the basis of the torque/throttle opening map (FIG. 3 (*c*)).

Next, the present embodiment calculates a required torque by consolidating (e.g., adding) required torques other than required torque A which is the most fluctuant of the three, that is to say, by consolidating required torques B and C (FIG. 3 (*b*)). The calculated torque is hereinafter referred to as the "B/C consolidated required torque". The B/C consolidated required torque is then converted to a throttle opening on the basis of the torque/throttle opening map (FIG. 3 (*c*)).

Figure 4:
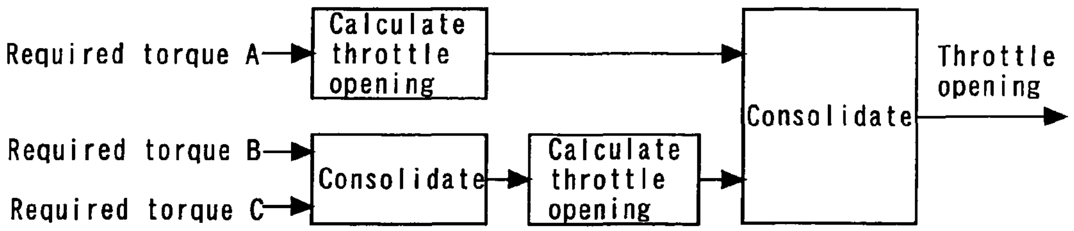
FIG. 4 is a diagram illustrating a flow of signals used with the throttle opening calculation method shown in FIG. 3.

Next, a final throttle opening is calculated (FIG. 3 (*d*)) by consolidating (e.g., adding) the required throttle opening providing the required torque A and the required throttle opening providing the B/C consolidated required torque, which are obtained as described above. FIG. 4 is a diagram summarizing the flow of signals used with the method shown in FIG. 3.

As shown in FIG. 3 (*c*), the throttle opening providing required torque A is not within the WOT region where the sensitivity is high. Therefore, the method according to the present embodiment does not incur excessive throttle opening variation. Consequently, the final throttle opening which is calculated by consolidating the throttle opening providing required torque A and the required throttle opening providing the B/C consolidated required torque does not excessively change. As described above, the method according to the present embodiment makes it possible to surely prevent the throttle opening from moving excessively.

[Details of Process Performed by First Embodiment]

Figure 5:
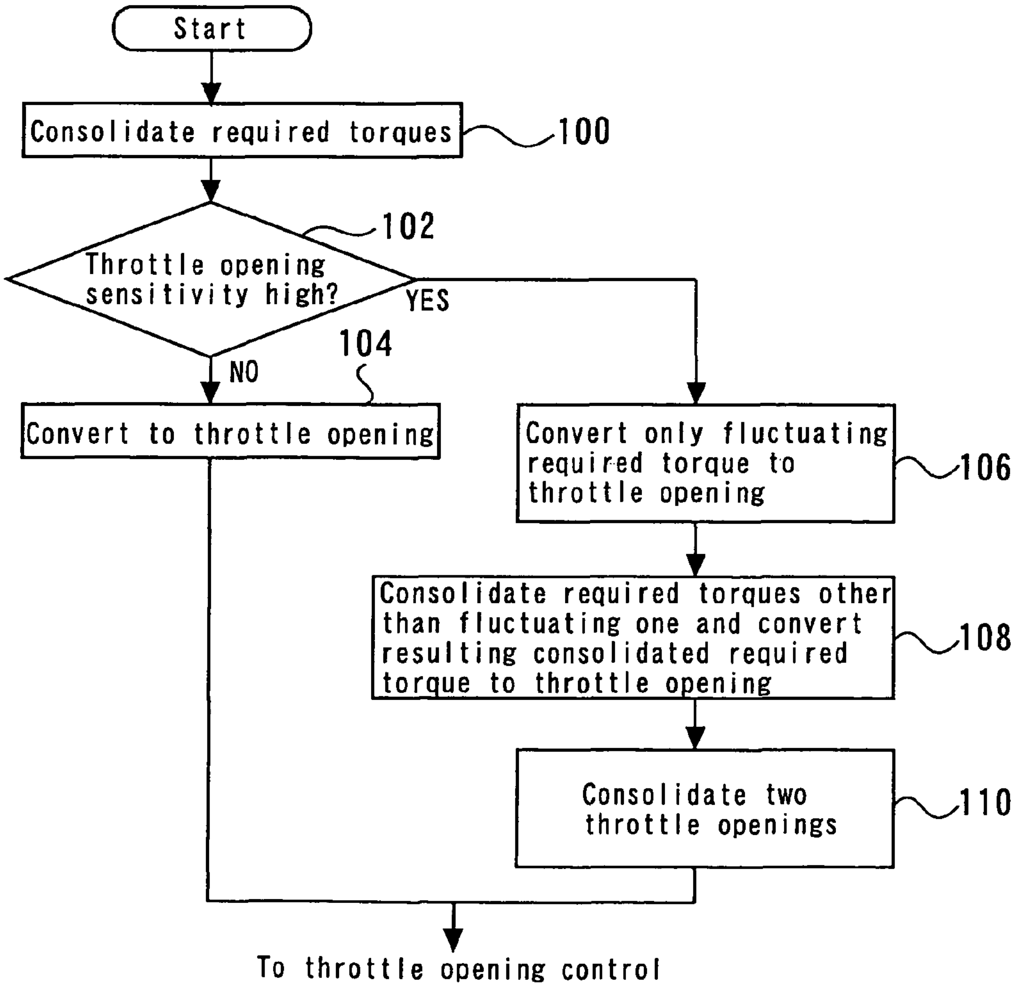
FIG. 5 is a flowchart illustrating a routine that is executed by the first embodiment of the present invention.

FIG. 5 is a flowchart illustrating a routine that the ECU 50 executes in the present embodiment to implement the above-described functionality. First of all, the routine shown in FIG. 5 performs step 100 to consolidate (e.g., add) a plurality of required torques brought to the internal combustion engine 10.

Next, on the basis of a required torque after the consolidation calculated in step 100 (this torque is hereinafter referred to as the "after-consolidation required torque"), the routine performs step 102 to judge whether the sensitivity of throttle opening variation corresponding to torque variation is high. In step 102, when, for instance, the aforementioned torque/throttle opening map indicates that the after-consolidation required torque is within the predefined WOT region, it is judged that the sensitivity of throttle opening variation corresponding to torque variation is high. Alternatively, this judgment step may be performed by calculating a slight change $\Delta TA$ in the throttle opening by probatively converting a slight change $\Delta Trq$ in the after-consolidation required torque on the basis of the torque/throttle opening map, and concluding, when the quotient $\Delta TA/\Delta Trq$ is greater than a predetermined threshold value, that the sensitivity of throttle opening variation corresponding to torque variation is high.

When the judgment result obtained in step 102 does not indicate that the sensitivity of throttle opening variation corresponding to torque variation is high, it can be concluded that the throttle opening does not change excessively even when the after-consolidation required torque is directly converted to a throttle opening. In this instance, therefore, step 104 is performed to convert the after-consolidation required torque to a throttle opening on the basis of the torque/throttle opening map.

When, on the other hand, the judgment result obtained in step 102 indicates that the sensitivity of throttle opening variation corresponding to torque variation is high, only a fluctuating required torque is selected from the plurality of required torques and converted to a throttle opening on the basis of the torque/throttle opening map (step 106).

Next, required torques other than the fluctuating required torque selected in step 106 are consolidated. The consolidated required torque is then converted to a throttle opening on the basis of the torque/throttle opening map (step 108). At last, a final throttle opening is calculated by consolidating the required throttle opening calculated in step 106 and the required throttle opening calculated in step 108 (step 110).

Even in a region where the sensitivity of throttle opening variation corresponding to torque variation is high, the present embodiment, which has been described above, makes it possible to surely prevent the throttle opening from changing excessively (drastically). Therefore, the durability of the throttle valve 20 can be enhanced to avoid malfunction.

In the first embodiment which has been described above, the ABS-ECU 52 and VSC-ECU 54 correspond to the "required torque output means" according to the first aspect of the present invention. Further, the "required torque output means" according to the first aspect are implemented when the ECU 50 calculates the driver required torque on the basis of the accelerator opening and calculates the accessory drive required torque on the basis of the operating status of accessories; the "sensitivity judgment means" according to the first aspect is implemented when the ECU 50 performs steps 100 and 102; and the "throttle opening calculation means" according to the first aspect is implemented when the ECU 50 performs steps 106 to 110.

Second Embodiment

A second embodiment of the present invention will now be described with reference to FIGS. 6 and 7. However, the differences between the second embodiment and the above-described first embodiment will be mainly described while abridging or omitting the description of matters common to these embodiments. The second embodiment is implemented when it uses the same system configuration as the first embodiment shown in FIG. 1; and causes the ECU 50 to execute a later-described routine shown in FIG. 7.

[Features of Second Embodiment]

Figure 6:
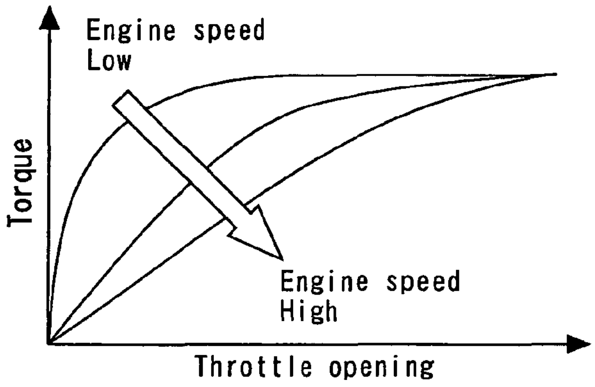
FIG. 6 is a diagram illustrating the torque/throttle opening map.

FIG. 6 is a diagram illustrating the torque/throttle opening map. As indicated in this figure, the sensitivity of throttle opening variation corresponding to torque variation also varies with engine speed. More specifically, the sensitivity of throttle opening variation corresponding to torque variation is high in a region where the throttle opening is large and the engine speed is low. However, even in a region where the throttle opening is large, the sensitivity of throttle opening variation corresponding to torque variation decreases with an increase in the engine speed.

Consequently, if it is in a region where the sensitivity of throttle opening variation corresponding to torque variation is high, the present embodiment makes it move to a region where such sensitivity is not high by changing (increasing) the engine speed.

In the present embodiment, either of the following two methods can be selected to change the engine speed:

(1) Increasing the engine speed by decreasing the load for accessory driving (2) Increasing the engine speed by increasing the after-consolidation required torque

[Details of Process Performed by Second Embodiment]

Figure 7:
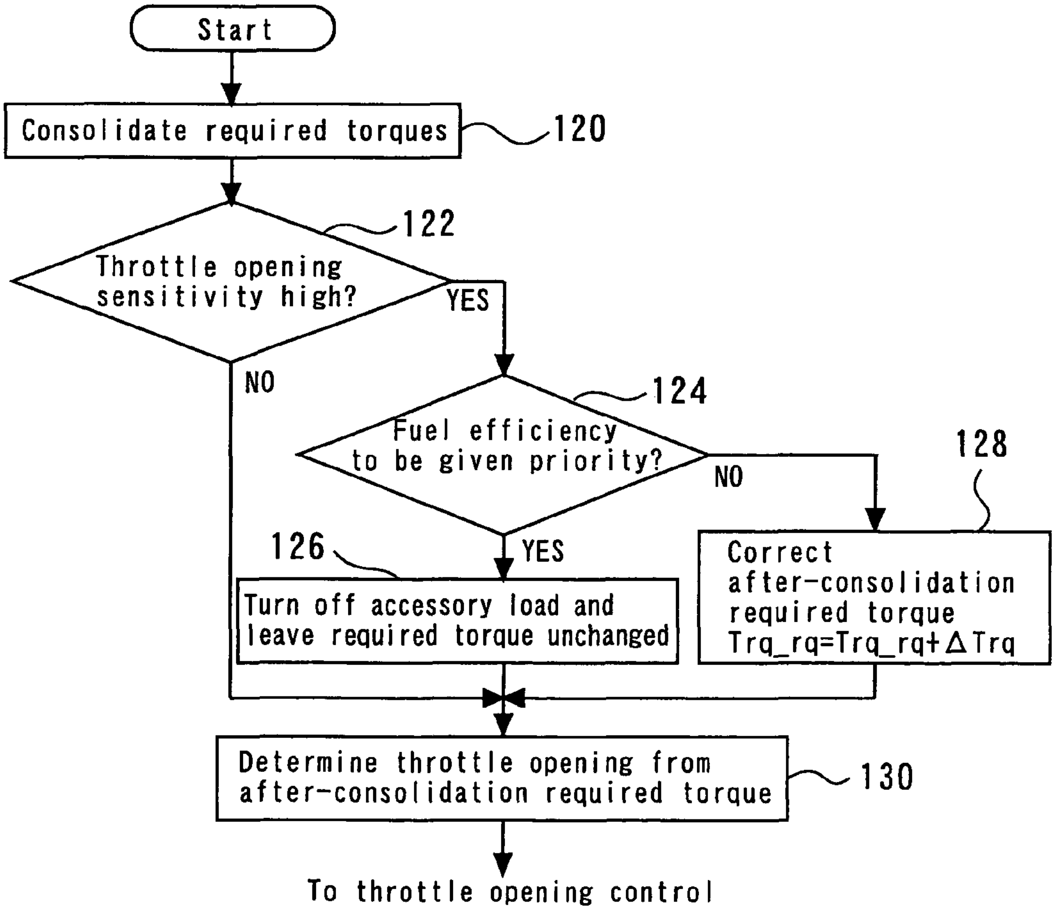
FIG. 7 is a flowchart illustrating a routine that is executed by the second embodiment of the present invention.

FIG. 7 is a flowchart illustrating a routine that the ECU 50 executes in the present embodiment to implement the above-described functionality. First of all, the routine shown in FIG. 7 performs step 120 to consolidate a plurality of required torques brought to the internal combustion engine 10. Next, on the basis of the after-consolidation required torque calculated in step 120, the routine performs step 122 to judge whether the sensitivity of throttle opening variation corresponding to torque variation is high. This processing step is the same as step 102 in the first embodiment which has been described earlier.

When the judgment result obtained in step 122 indicates that the sensitivity of throttle opening variation corresponding to torque variation is high, the routine proceeds to step 124 and judges whether a fuel efficiency priority mode prevails. In the present embodiment, the ECU 50 operates the internal combustion engine 10 in the fuel efficiency priority mode depending, for instance, on an operation performed by the driver or a status of the vehicle. In the fuel efficiency priority mode, fuel efficiency is given particular priority. When the judgment result obtained in step 124 indicates that the fuel efficiency mode prevails, step 126 is performed to turn off some or all of the accessories.

When, on the other hand, the judgment result obtained in step 124 does not indicate that the fuel efficiency mode prevails, step 128 is performed to correct the after-consolidation required torque Trq_rq, which is calculated in step 120, in accordance with the following equation:

$$Trq\_rq = Trq\_rq + \Delta Trq \quad (1)$$

According to Equation (1) above, the after-consolidation required torque is increased by adding a correction value ΔTrq to the after-consolidation required torque Trq_rq calculated in step 120.

After completion of step 126 or 128, step 130 is performed to convert the after-consolidation required torque to a throttle opening on the basis of the torque/throttle opening map. When, in this instance, step 126 has been performed, the torque consumed for accessory driving decreases. The engine speed then increases because the resulting engine torque is more than enough. When, on the other hand, step 128 has been performed, the after-consolidation required torque is increased. The engine speed then increases because the resulting engine torque is more than enough. This causes a transition from a region where the sensitivity of throttle opening variation corresponding to torque variation is high to a region where such sensitivity is not high. As a result, it is possible to surely prevent the throttle opening from changing excessively.

In the fuel efficiency priority mode, the routine shown in FIG. 7 reduces an accessory drive load. Therefore, the engine speed can be increased without increasing the fuel consumption. This makes it possible to prevent the deterioration of fuel efficiency.

When the judgment result obtained in step 122 does not indicate that the sensitivity of throttle opening variation corresponding to torque variation is high, it can be concluded that the throttle opening does not change excessively even when the after-consolidation required torque is directly converted to a throttle opening. In this instance, therefore, step 130 is performed to directly convert the after-consolidation required torque to a throttle opening on the basis of the torque/throttle opening map.

In the second embodiment which has been described above, the "throttle opening calculation means" according to the second aspect of the present invention is implemented when the ECU 50 performs steps 120 and 130; the "sensitivity judgment means" according to the second aspect is implemented when the ECU 50 performs step 122; and the "engine speed change means" according to the second aspect is implemented when the ECU 50 performs steps 124, 126, and 128.

The invention claimed is:

1. A control apparatus for an internal combustion engine, the control apparatus comprising:

a plurality of required torque output means for outputting the required torque, each of which outputs a required torque on the basis of its own purpose to the internal combustion engine;

sensitivity judgment means for judging, on the basis of an after-consolidation required torque, whether a sensitivity of throttle opening variation corresponding to torque variation is higher than a reference value, the after-consolidation required torque being determined by consolidating the required torques output from the plurality of required torque output means; and throttle opening calculation means, for calculating when the sensitivity is judged to be higher than the reference value, calculates a throttle opening by consolidating a first required throttle opening and a second required throttle opening, the first required throttle opening being determined by converting the most fluctuant one of the plurality of required torques to a throttle opening, the second required throttle opening being determined by consolidating the remaining required torques and converting the resulting consolidated required torque to a throttle opening.

2. A control apparatus for an internal combustion engine, the control apparatus comprising:

a plurality of required torque output devices for outputting the required torque, each of which outputs a required torque on the basis of its own purpose to the internal combustion engine;

a sensitivity judgment device for judging, on the basis of an after-consolidation required torque, whether a sensitivity of throttle opening variation corresponding to torque variation is higher than a reference value, the after-consolidation required torque being determined by consolidating the required torques output from the plurality of required torque output devices; and a throttle opening calculation device for calculating, when the sensitivity is judged to be higher than the reference value, calculates a throttle opening by consolidating a first required throttle opening and a second required throne opening, the first required throttle opening being determined by converting the most fluctuant one of the plurality of required torques to a throttle opening, the second required throttle opening being determined by consolidating the remaining required torques and converting the resulting consolidated required torque to a throttle opening.

* * * * *